United States Patent [19]

Jones

[11] 4,365,618
[45] Dec. 28, 1982

[54] HELIOSTATIC SOLAR ENERGY CONVERSION SYSTEM

[76] Inventor: Dedger Jones, 3451 Stonehaven Ct., South, Columbus, Ohio 43220

[21] Appl. No.: 213,210

[22] Filed: Dec. 5, 1980

[51] Int. Cl.³ .......................... F24J 3/02; A63G 21/00
[52] U.S. Cl. .................................... 126/425; 126/438; 104/135
[58] Field of Search ....................... 126/424, 425, 438; 104/135; 353/3; 250/203 R

[56] References Cited

U.S. PATENT DOCUMENTS

| | | | |
|---|---|---|---|
| 514,669 | 2/1894 | Allingham . | |
| 811,274 | 1/1906 | Carter | 126/424 |
| 1,386,781 | 8/1921 | Harvey . | |
| 3,884,217 | 5/1975 | Wartes | 126/270 |
| 3,905,352 | 9/1975 | Jahn | 126/270 |
| 3,977,773 | 8/1976 | Hubbard | 126/425 |
| 4,266,530 | 5/1981 | Steadman | 74/56 |

FOREIGN PATENT DOCUMENTS 2356095  6/1976  France ................. 126/437

OTHER PUBLICATIONS

"The Rise of Control Receivers" by A. C. Skinrod—p. 84—Solar Age—Aug. 1980.
"A Novel Design for a Solar Concentrating System" A Thesis by Thomas Alan Pettenski—Ohio State Univ.—1980.

*Primary Examiner*—Samuel Scott
*Assistant Examiner*—G. Anderson
*Attorney, Agent, or Firm*—Robert B. Watkins

[57] ABSTRACT

A heliostatic solar energy conversion system in which a plurality of multi-faceted heliostats are supported on one or more platforms that move in a segment of a circular path about a central receiver as a center. The heliostats are mounted in frames that pivot on the platform on an edge of each heliostat. In one embodiment the platforms are supported in a concave spherical depression in the ground. The heliostats of the invention are constructed with a plurality of intersecting beams and stringers, and the stringers are formed with parabolic flanges which support the facets so that the angle of incidence between the sun and the focal point of the central receiver is generally in the center of each facet. A vernier adjustment is provided for each heliostat.

9 Claims, 14 Drawing Figures

HELIOSTATIC SOLAR ENERGY CONVERSION SYSTEM

SUMMARY OF THE INVENTION

This invention relates to a heliostatic solar energy conversion system and more particularly to one of the central receiver solar power plant type. The invention also relates to various heliostat construction features and focusing means.

Briefly and in summary, the invention is a solar energy conversion system which includes a field of heliostats having a plurality of reflective facets, such as mirrors, and a central receiver which is positioned a selected distance apart from the heliostat, forming a selected angle of incidence at the center of each facet between the rays of the sun and the central receiver. It comprises one or more platforms supporting a plurality of frames with each frame having edges and supporting a plurality of the reflecting facets which in combination are in fixed position to comprise a heliostat, with each platform being constructed for movement in a substantially circular path in the horizontal plane about the central receiver as a center, and with each frame being pivotally supported on the platform on a axis coincident with one edge of each frame.

In an important embodiment of the invention the platform or platforms rotate about the central receiver in a semi-spherical concave depression in the ground providing significant economies in the construction of central receiver solar power plants.

Another important feature of the invention is embodied in the construction of the heliostat frame which is pivotally supported at one edge and comprises intersecting beams and stringers, with the stringers having a parabolic contoured flange on which are fastened facets or mirrors.

Still another feature of the invention is the construction providing for a vernier adjustment in the azmuthal position of each heliostat by cam means operable to rotate the heliostat about a vertical axis when the heliostat is rotated about the horizontal axis.

The world is facing an energy crisis. Rising costs and predicted shortages of conventional energy resources have renewed interest in the development of alternative forms of energy. Indications are that one of these forms, solar energy, will have an impact on the world's future energy needs. Obvious difficulties in the use of solar energy include the diurnal and seasonal cycles, the unpredictable effects of the weather, the nonstorability of the energy in its primary form, and the low-power density of the direct radiation. This invention is directed to overcoming some of these difficulties.

The bulk of solar thermal mechanical systems are of the central receiver solar power plant type. Central receiver systems are capable of providing block power in the range of one to several hundred megawatts per plant. A solar thermal power plant has 5 major subsystems. These are the optical collector plant concentrator (often a heliostat), the receiver and heat transfer elements, the prime mover/electrical generator, thermal storage and a backup generation unit. Many central receiver solar power plants use a number of two axis tracking mirrors or heliostats to redirect and focus sunlight onto an absorber for the production of a heated working fluid. The heliostats constitute the largest expense in a central receiver solar power plant. A motivation of this invention is to provide an economical heliostat construction.

Almost all central receiver power plants can be classified as solar thermal conversion (STC) systems. These systems collect solar radiation and convert it to thermal energy and ultimately electric power. The heat is transferred to a working fluid for use in a solar thermal electric conversion system primarily to generate electricity. Solar thermal electric energy systems utilize a high temperature thermo dynamic cycle to convert solar energy to electrical energy with maximum efficiency. Waste heat is rejected to the environment at as low a temperature as practical.

In a solar total energy system, solar energy is used to generate electricity also, but under a constraint that the rejected heat is to be at a high temperature suitable for space heating, water heating, operation of absorption air conditioning, or commercial processes. Although the generation of electricity is deliberately less efficient in a total energy system, the overall efficiency of utilization of the collected solar radiation is much greater.

The primary limitation to wide spread implementation of both kinds of solar thermal systems in the past has stemmed from the relatively high cost estimated for solar power systems as compared to the cost of utilizing fossil or nuclear fuels. Advanced concepts, new materials and innovative engineering of systems indicate that energy costs in the future for solar thermal conversion systems can be competitive with fossil fuel sources.

The construction and testing of central receiver solar power plants is a rapidly growing and ever changing technological endeavor. Only a few test facilities are constructed and operating. Existing facilities range from the French M-1 solar furnace in Odeillo, France, to the solar total energy large scale experiment at Shenandoah, Ga., which is set up to provide both electrical power and thermal energy for processed steam heating and air conditioning requirements. At Sandia lab in Albuquerque, N. Mex., a computer controlled heliostatic system is in operation.

The intent of this invention is to provide a novel heliostatic solar energy conversion system that will cost considerably less to produce, set up, and maintain. The field of heliostats will employ readily obtainable stock materials and simple, common manufacturing processes.

Solar thermal electric power plants can usually be classified as two types, central receiver and distributive collection systems. In the central receiver system, a large field of reflecting mirrors (heliostats) are used to concentrate energy on a tower-mounted receiver. In the distributive collection systems, the thermal energy is concentrated at a large number of disbursing stations throughout the collecting field which then can be combined and transported to a central location.

Because the central receiver system focuses all of the incoming direct solar radiation on a single point, temperatures upwards of 1,000° F. (540° C.) are obtainable. The collector/concentrator/reflector subsystem inherent in all central receiver systems consists of a field of heliostats and a tracking control system to maintain continuous focus on the tower-mounted central receiver. The heliostats must track the sun in two dimensions; this is, one dimension tracks the altitudinal motion of the sun while the other dimension is concerned with the azimuthal motion of the sun. The altitudinal motion of the sun varies according to the time of day and time of the year. The aximuthal motion of the sun varies both with time of day and the time of the year, but primarily with the time of the day, making one arc of approximately 180° each day.

One large scale example of prior art is the CNRS 1,000 KW Solar Furnace at Odeillo, France, which will be described in further detail later. This unit employs a field of 63 heliostats each of which is 6×7.5 M. The heliostats follow the sun and reflect its rays onto a parabolic reflector that concentrates 1 megawatt (MW) of thermal energy into an area of about 40 cm (16 inches) in diameter at the focal point. In this area the heat flux is 1600 W per $cm^2$ and temperatures as high as 4100° K. are obtained.

Economic utilization of solar energy requires that the energy be collected cheaply and used efficiently. The heliostats in a heliostatic solar thermal electric energy power plant represent approximately 85% of the total cost of the system. Consequently, it has been important in the past that they be nonuniformly distributed over the field so that the shading and blocking of one heliostat over another can be held to acceptable levels in every region of the field over the course of a day and a year. On the other hand, heliostats must be spaced as closely as possible to concentrate the energy in the central receiver allowing the fixed cost of the central receiver to be held within reasonable limits.

Another constraint has been the receiver size. For a given receiver size the radius of the field is ultimately limited by a boundary line beyond which the image size of the receiver becomes so large that an unexceptable fraction of the energy redirected by a heliostat bypasses the receiver. The one MW thermal unit at Odeillo, France, is an example of a system with a large and expensive central receiver. The heliostat field at the 5 MW thermal central receiver test facility in Albuquerque, N. Mex. and the 10 MW electric California Edison facility near Barstow, Calif., are examples of the large spacing of heliostats required to prevent blocking and shadowing.

It is an object of this invention that heliostats in the field may be used more efficiently thus fewer are required for necessary energy output. Another object is that the heliostats may be more closely concentrated together making possible a more closely confined focal point in the central receiver and therefore a less expensive more efficient central receiver construction.

In the large scale solar tower concept, the economic utilization of solar thermal energy is approached by using a field of low cost flat mirror heliostats to redirect the solar energy to a central receiver. Geometric effects generally limit the diameter of the heliostat field to 3 to 5 times the tower height. Beyond this range the reflected image size becomes impractically large for efficient collection at the receiver aperture. To prevent adjacent mirrors from excessively blocking the light redirected toward the receiver, the mirrors must be progressively sparsely distributed as the distance from the base of the tower increase. Studies have given optimum heliostat coverage to ground coverage ratios ranging from 0.8 near the tower base to 0.2 in the northern corners (for a south facing field) with an average ratio of 0.45. With this invention the average ratio remains near the optimum achievable at the center of the field (i.e. in line with the noonday azimuth).

Because the heliostats represent the major costs in the installation of a central receiver system, they should be able to be massed produced, able to withstand extreme weather conditions, easily installed and give long life at low maintenance. The optical behavior of the reflecting heliostats is influenced by many factors, some predictable, like mirror reflectivity, slant range (distance from the center of the heliostat to the center of the receiver) and facet configuration. Other factors are of the nonpredictable type, such as sun tracking errors, surface slope errors and intermittent wind loading.

Sunlight impinges on a heliostat facet surface in a diverging beam in such a way that the incoming cone has an apex angle of about 0.01 radians. This is determined by and is due to the size of the sun disk which varies slightly throughout the year. The cone is further widened by atmospheric scattering, especially during hazy, atmospheric conditions. Upon reflection from a facet surface the cone may be effectively broadened still more by the surface characteristics of the reflector facet and by the variations and vagueries of alignment behavior.

Although the reflected sun shape cone coming from the surface of the reflector facet, would be unchanged, in practice surface characteristics and surface alignment uncertainties cause each reflected cone of rays to be subject to a distribution of directions called the error cone. The average effective behavior of the reflected rays is described by a second cone which is larger than the sun shaped cone. The concepts of an "error cone" and "effective reflected cone" are useful in providing guidance in planning the measurement and analysis of surface reflecting properties, surface slope error and heliostat alignment errors.

The further discussion of the prior art, and principles of heliostatic use and construction will be found in the detailed description of the invention.

For the reasons stated, there is strong emphasis being given to the cost reduction of heliostats and heliostatic solar thermal energy conversion systems. The Department of Energy of the United States has established a goal to achieve an installed cost of $100 per $M^2$ (1978 dollars) of reflector area by the year 1990. It is an object of this invention to meet this objective by features of this invention including reduction in the number of heliostats for a required energy output, or stated conversely, higher reflection efficiency per heliostat over a given day or period of days.

In addition to reducing the number of heliostats and increasing heliostat efficiency, it is an object of this invention to provide novel heliostat construction in which the ideal parabolic surface for the collection and concentration of the suns rays is simulated by an assembly of reflecting facets or mirrors which the facets are fixedly fastened to a frame made up of beams and stringers making a composite series of anchor points for the facets which are on the surface of the parabola. Details of the construction of the heliostat and its frame are important features of the invention.

Still another feature of the invention and an object is to provide a novel manner of adjusting the attitude and azimuth of the heliostats in a field.

The prior art reveals that many attempts have been made to find the optimum solution to the many problems of efficiently using solar energy in a heliostatic solar energy conversion system. U.S. Pat. Nos. 3,892,433 and 3,905,352 are typical examples of these approaches.

Other objects and features of the invention will be apparent and understood from the detailed description of the invention and the accompanying drawings which follow.

DETAILED DESCRIPTION OF THE INVENTION

Figure 1:
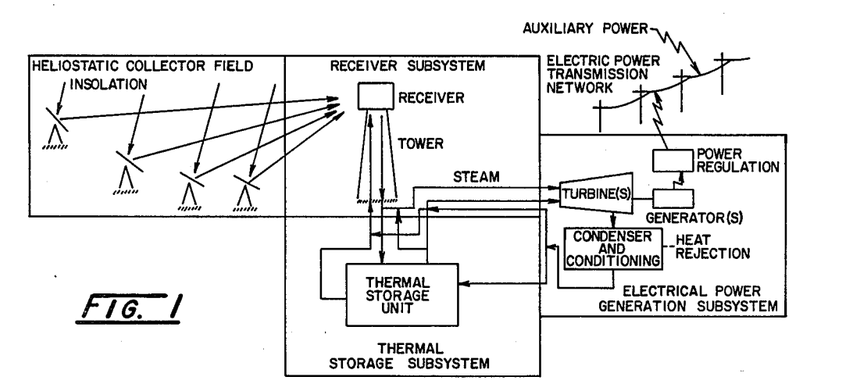
FIG. 1 is a schematic diagram of a central receiver solar thermal power system.

Referring to FIG. 1, in the typical central receiver solar thermal power system, a heliostatic collector field receives insolation and reflects the sun rays to a central receiver on a tower. A working fluid, such as water/steam circulates through the receiver either directly to turbines which drive a generator or through a thermal storage unit for later use by the turbines. Electric power from the generators is transmitted through a network which may be also supplied by an auxiliary power unit.

Figure 2:
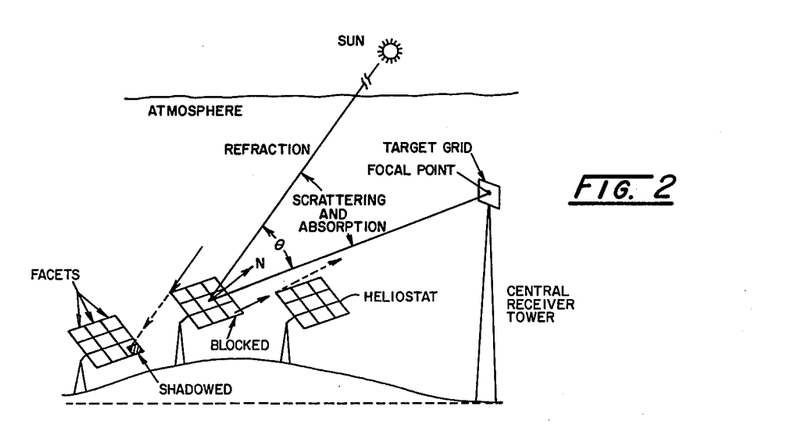
FIG. 2 is a schematic drawing of a typical prior art heliostatic collector field.

Referring to FIG. 2, in a typical heliostatic central receiver solar energy conversion system, heliostats having a plurality of facets which are co-planer are pivotally adjusted to attract the sun rays through an angle of incidence $\theta$ to an aiming point on the target grid of the central receiver. The total energy of the sun does not reach the target grid because of scattering and absorption in the atmosphere surrounding the earth.

Three heliostats are shown on a small hill to illustrate that the ground may not be level. The placement of the aim point and the target grid are arbitrarily selected. Different aim points may be used for different heliostats.

In a heliostatic field some of the heliostats may interfere with others by partial "shadowing" them from the incoming sunlight. This effect is likely to become severe when the sun position is low in the sky (morning, evenings, and winter months). The central receiver tower or other objects may also shadow part of the field. A sun reflected from one heliostat may be "blocked" by another heliostat or by some object to prevent it from reaching the target grid. Since the heliostats represent about 85% of the total costs of a central receiver system, placement of the heliostats in the field is of importance to achieve optimum utilization. Most heliostatic fields use an array with north-south columns and east-west rows with spacing determined so that little shading or blocking of the sun rays occur at midday during mid-winter (when the sun rays are lowest but most intense).

Figure 3:
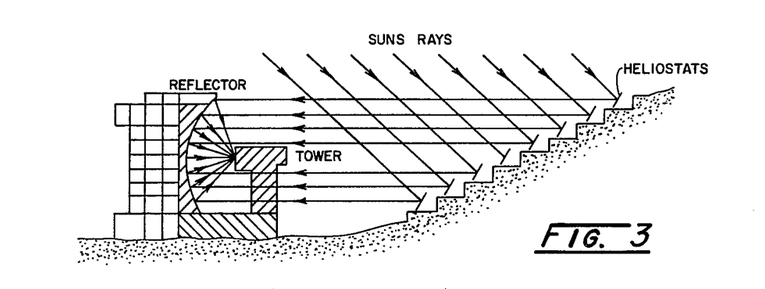
FIG. 3 is the diagrammatic elevation view of the CNRS Solar Furnace at Odeillo, France.

Referring to FIG. 3, the CNRS Solar Furnace has a field of heliostats which direct the sun rays into a parabolic reflector thirty-nine meters high that focuses the sun rays onto a tower. The heliostats are arranged on a slope to reduce blocking and shadowing. Each heliostat pivots and is provided with a sensor and control mechanism to track the sun. In this arrangement the heliostat ground coverage is reduced due to the blockage by the tower in front of the reflector. In addition, the number of heliostats is limited because the reflector is large and in a fixed position.

This invention concerns the solar energy conversion portion of a solar thermal power system.

Figure 4:
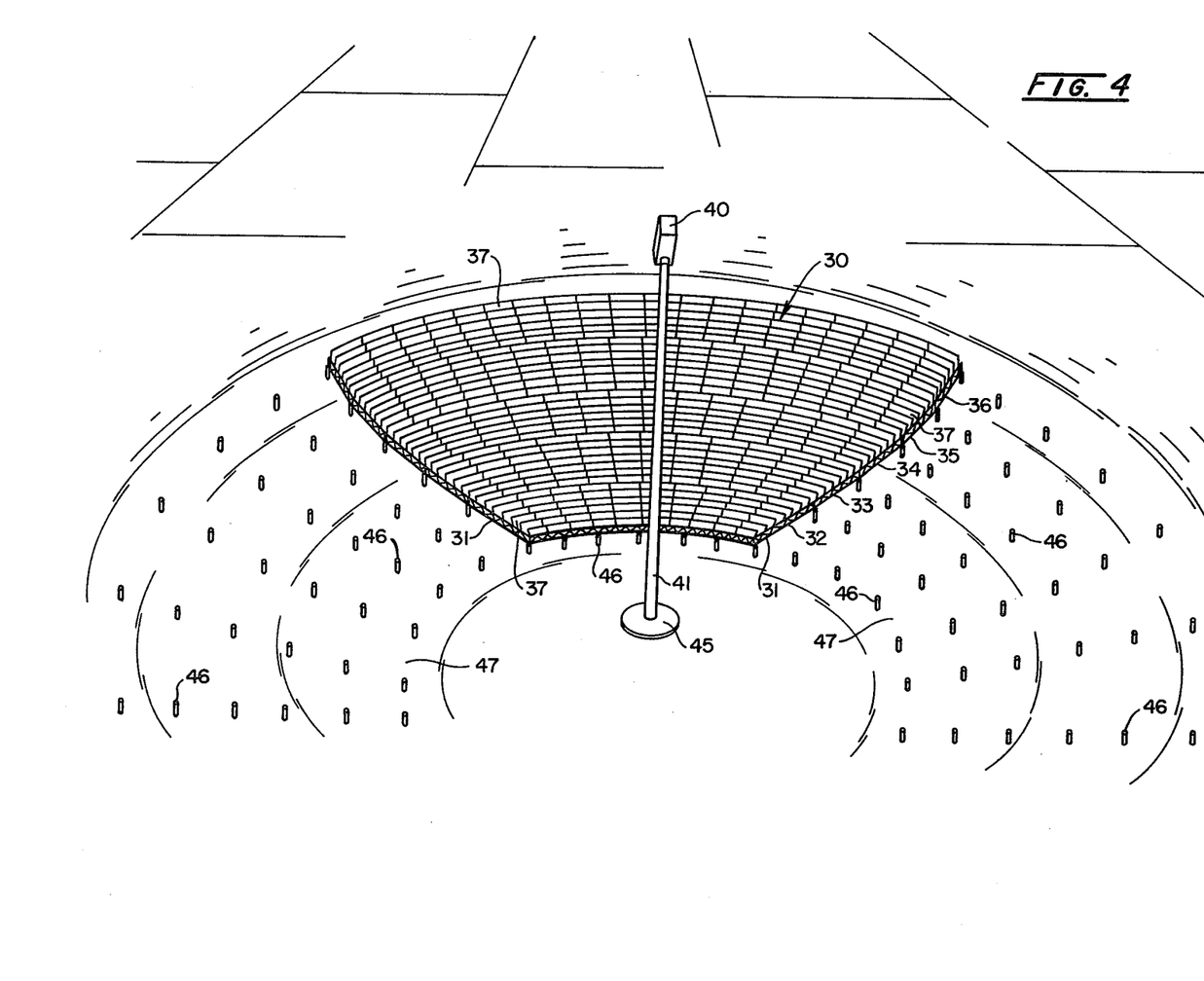
FIG. 4 is a perspective view of the central receiver and heliostatic collector field of the solar energy conversion system of this invention.
Figure 5:
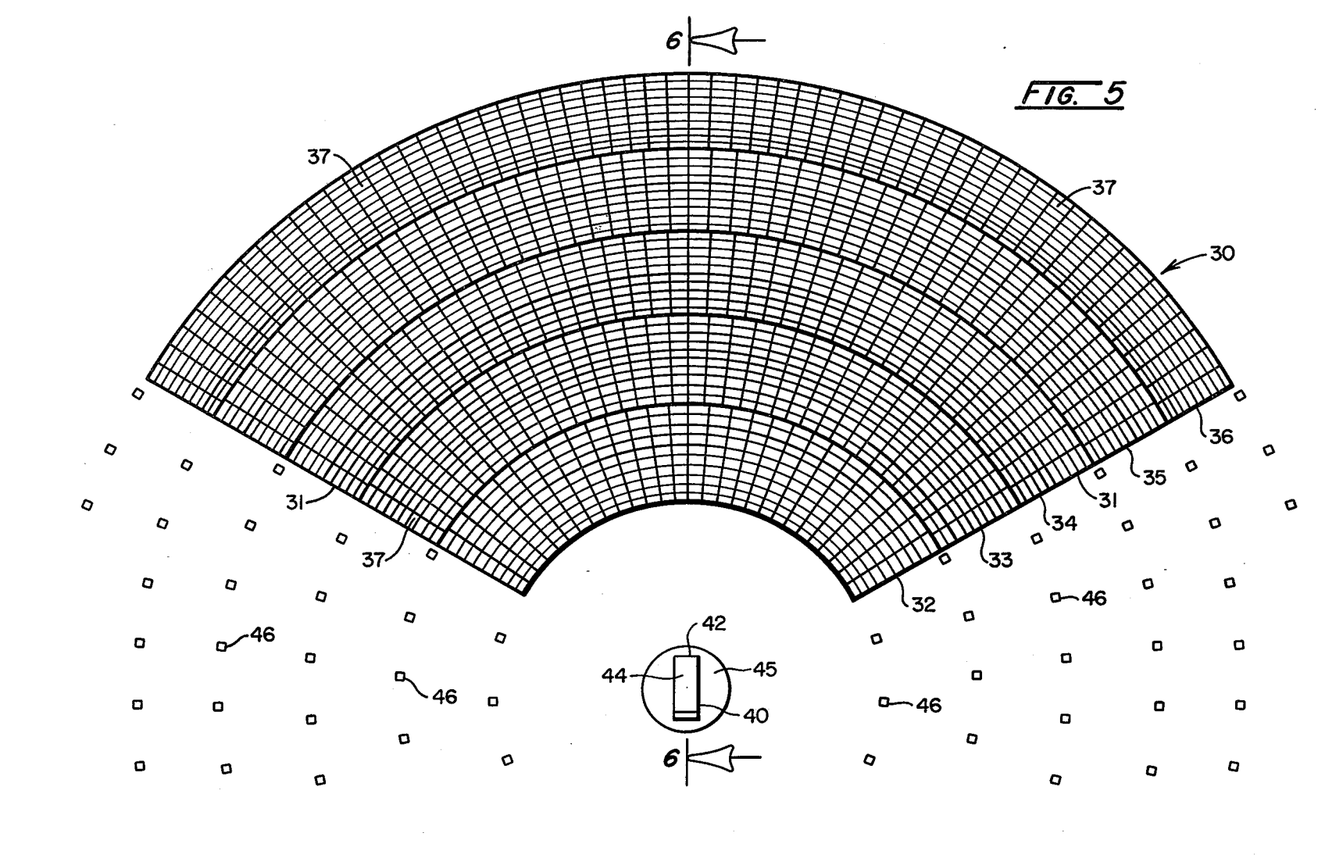
FIG. 5 is a plan view of a portion of the heliostatic collector field of this invention.
Figure 6:
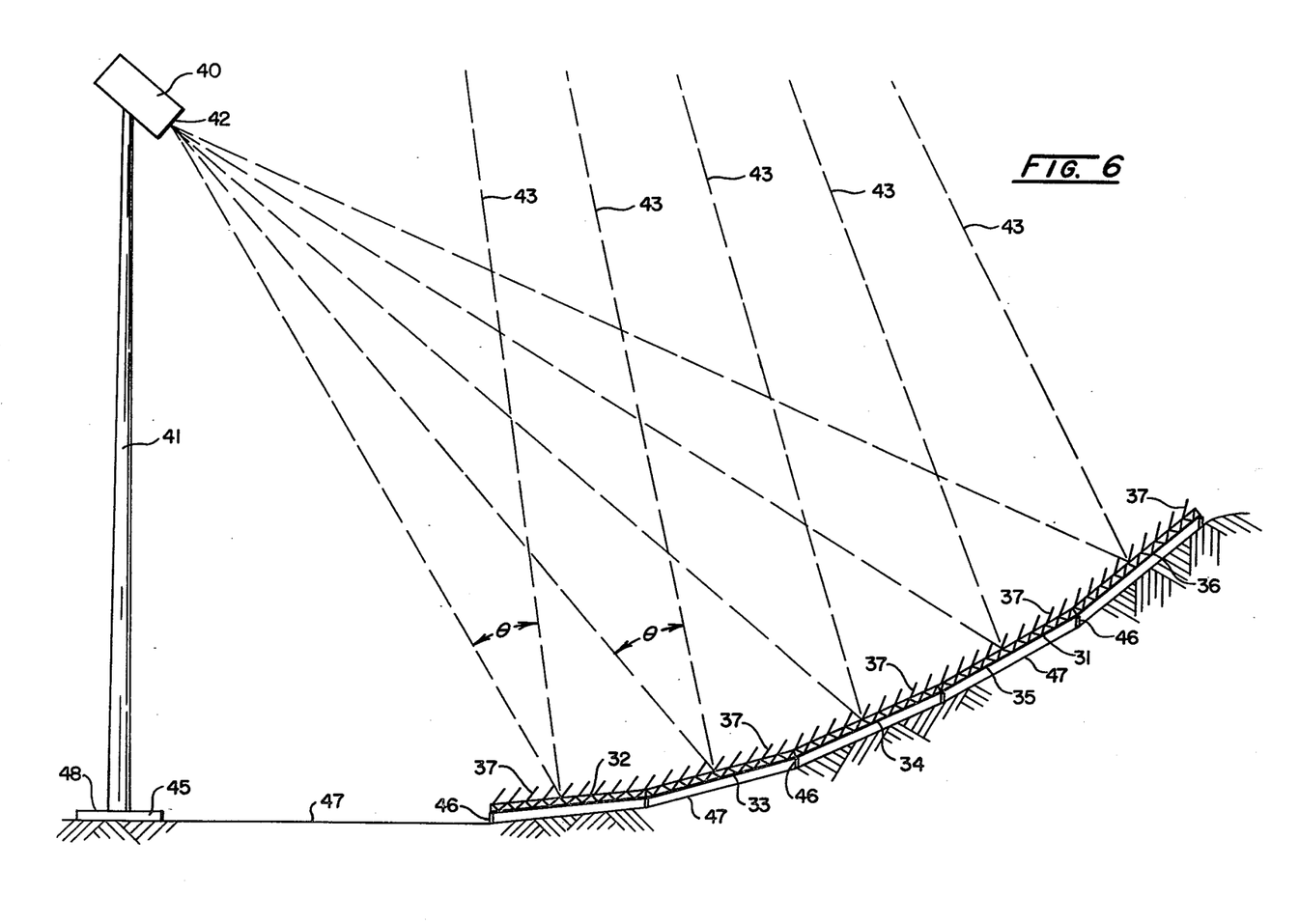
FIG. 6 is an elevational view of the heliostatic collector field of this invention taken along the line 6—6 of FIG. 5.

Referring to FIGS. 4, 5 and 6 a heliostatic field 30 is supported on a platform 31. In the preferred embodiment shown, the platform is divided into a plurality of segments 32, 33, 34, 35, and 36. Each segment 32–36 supports a plurality of individual heliostats 37.

A central receiver 40 is supported on a tower 41 with a common center 44. The receiver 40 has an aperture or target area 42 facing the heliostatic field 30. In operation, rays 43 from the sun strike the heliostats 37 and are reflected to the target 42 through an angle of incidence $\theta$.

The central receiver 40 and the tower 41 are provided with means 45 for rotation about the center 44. The rotation means 45 may be any well known construction such as rollers or bearings (not shown).

The heliostatic field 30 and the platform 31 are constructed as an angular segment of a circle having a center the same as center 44 of the central receiver 40. A support and rotation means 46 (more clearly shown in FIG. 8) is provided at appropriate and necessary points beneath the platform 31. Additional power operated means is provided to move the platform 31 in a circular path of rotation about the central receiver 40 and the center 44. Control means (not shown) is provided to rotate the central receiver 40 and the platform 31 in coordinated unison to most effectively track the sun and use the heliostatic field 30 by reflecting the maximum amount of available insolation during a days cycle.

Assuming that the solar energy conversion system is facing south, as shown in FIG. 4 (i.e. the heliostatic field 30 is balanced for a maximum reflectance at high noon), the platform 31 and the central receiver 40 rotate and more approximately 90 degrees in each direction to reflect the morning and evening sun, respectively, at maximum intensity.

As shown in FIGS. 4 and 6, the heliostatic field 30 and the platform 31 are constructed to rotate on the supports 46 which are anchored in the ground 47. The ground 47, has been excavated or filled to have the contour of an ampitheater or depression. The depression is a generally concave, portion of a sphere about the center 44 of the central receiver 40.

As seen in FIG. 6, the ground slopes upward from the level of a base 48 of the central receiver tower 41. The upward slope of the ground 47 from the level of the base 48 provides that the various segments 32-36 are successively higher. This provides a better and more effective angle for a larger percentage of the individual heliostats 37 in the heliostatic field 30.

It will be understood that construction of the heliostatic field 30 in a depressed semi-circular ampitheater in the ground is to be preferred as it increases the ground coverage ratio in the use of the heliostats 37 in the field 30. However, the heliostatic field 30 could be substantially flat and planar if perpendicular to the central axis at the center 44 of the central receiver 40. Whether the concave construction of the preferred embodiment or a flat planer construction is used, the improved advantages, efficiencies, and better coverage ratios will be available if the heliostatic field is constructed for rotation about the center of the central receiver. These factors are most improved over prior art construction when the concave construction is combined with the field rotation.

It has been found that in the preferred embodiment, the ground coverage ratio in the heliostatic field is in the 0.8 to 0.85 range throughout the daily operating cycle. Since each heliostat 30 remains at a substantially constant distance from the target the heliostats are used at their maximum efficiency.

The central receiver 40 may be one of several suitable conventional constructions for generating saturated and super heated steam, heating pressurized water and liquid metal intermediate fluids, and heating air as an open cycle intermediate. It is believed that these central receivers will have excellent fluid dynamic stability for all the anticipated changes in heat flux distribution. To minimize radiant heat loss, a cavity-type receiver is believed to be the most appropriate.

Three types of towers can be used to support the receiver, either triangular truss steel with guyed towers, tubular steel guyed towers, or slip-formed concrete towers. For a large heavy steam generating receiver a tapered free-standing concrete tower is believed to be the best. For light, liquid-metal or air-cycle receivers, the guyed towers are more economical and sufficient.

Figure 7:
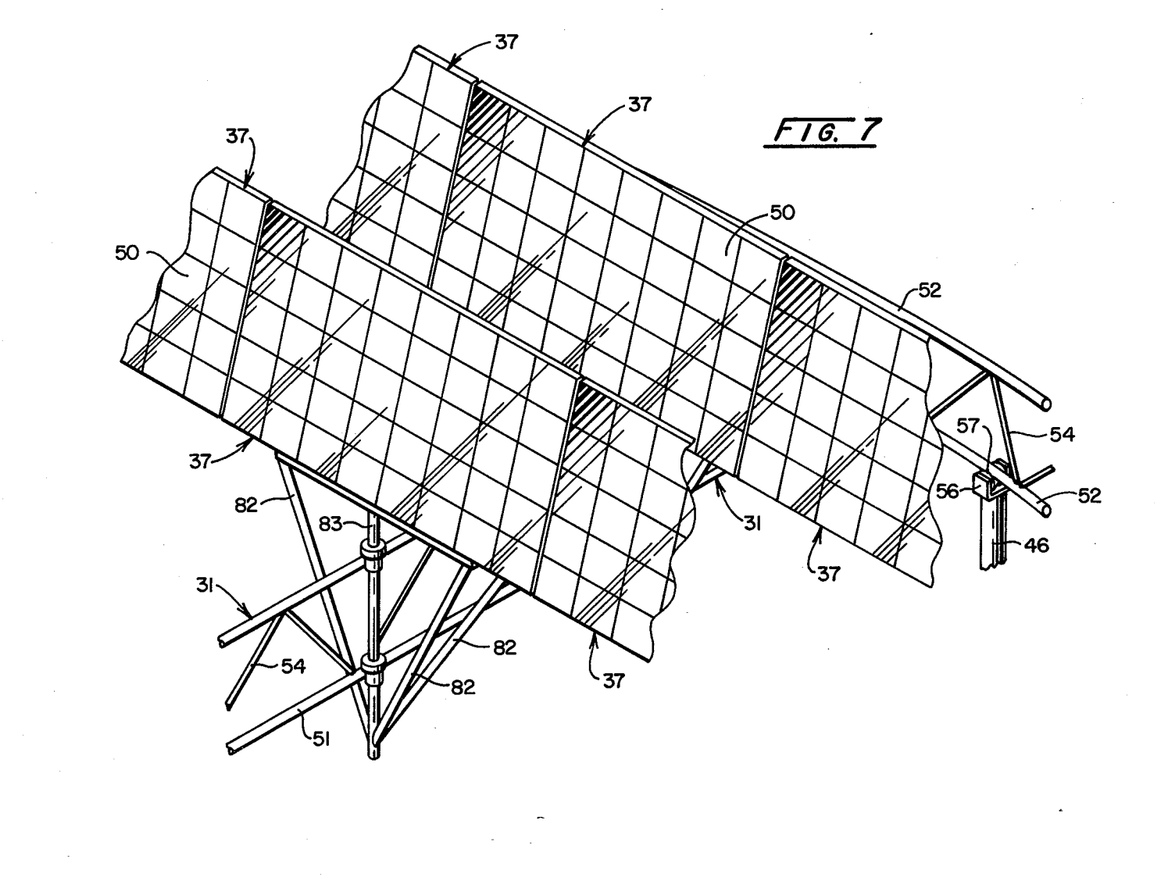
FIG. 7 is a perspective view of a portion of the platform and heliostat frames of this invention.
Figure 8:
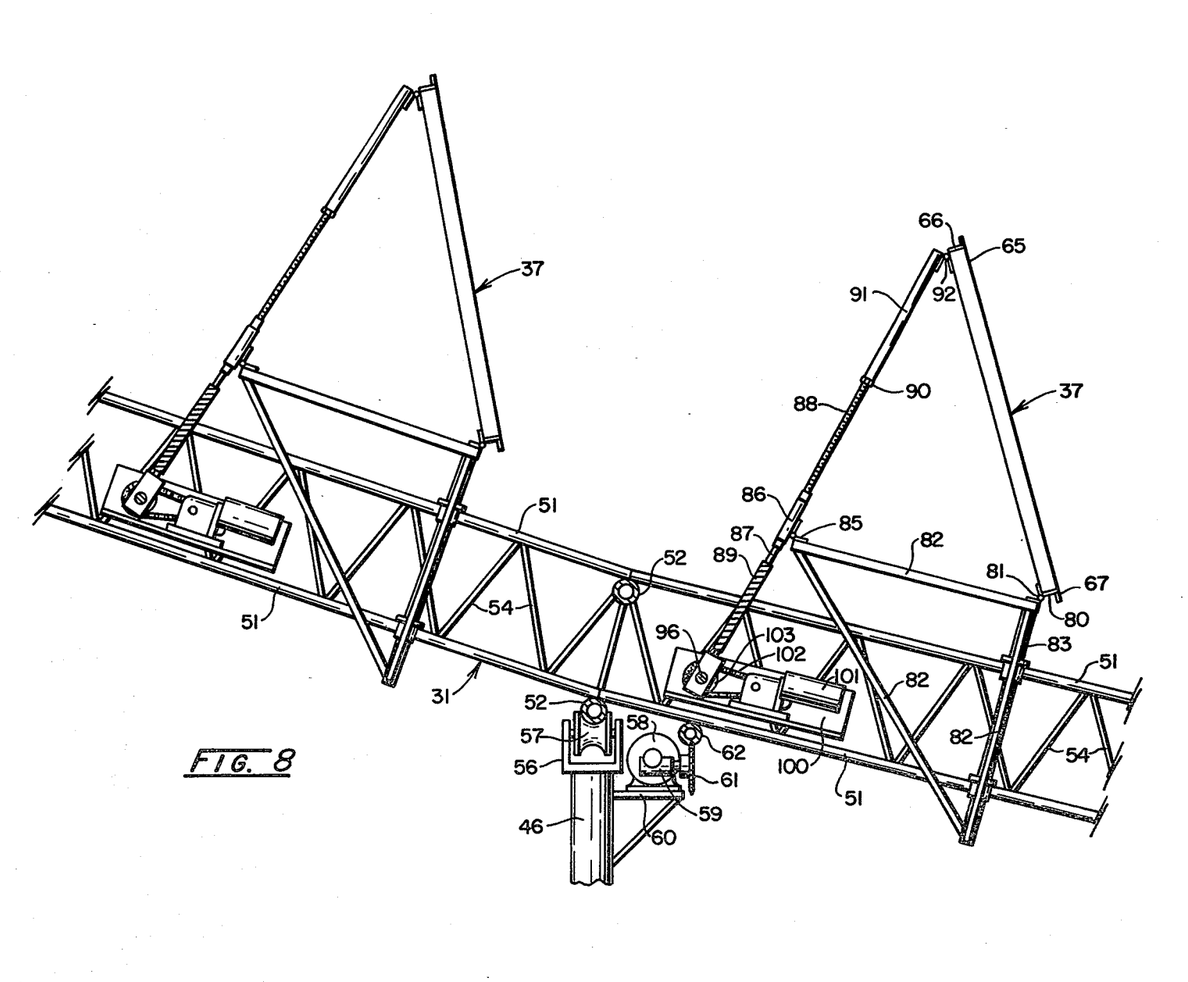
FIG. 8 is an elevational view of the end of the platform and heliostat frames of this invention.

Referring to FIGS. 7 and 8 a plurality of heliostats 37 are supported on the platform 31. Each heliostat 37 has a plurality of reflecting facets 50. The platform 31 comprises radially (with respect to the heliostatic field 30 and the central receiver center 44) positioned trusses. 51. Trusses 51 are supported by and fastened together with arcuate circumferential trusses 52. The trusses 51 and 52 making up the platform 31 may be of conventional light weight truss construction and welded from metal tubes 54.

Support means 46 for the rotational movement of the platform 31 is shown as a pipe column which is embedded in a concrete foundation (not shown) in the ground. The support means 46 has a trunnion member 56 supporting a rotatable roller 57. A lower tube 54 of the truss 52 rolls on the roller 57.

Drive means 58 including a gear motor 59 on a support 60 is positioned to drive a sprocket gear 61. This is engaged in a notched rail 62 which is fastened to the truss 51. The notched rail 62 is curvalinear in an arc that is concentric about the center of rotation 44 of the platform 31.

Means for sensing the axmuth position of the sun and/or means responsive to the time of day are provided to energize the drive means 58 as necessary to move the platform along the circular path about the central receiver center responsive to the azmuth position of the sun at various times of the day. Apparatus and methods for causing apparatus to track the sun are well known, and the state-of-the-art is advanced so that those skilled in the art will be able to practice the procedures required without difficulty. The gear motor 59 and other parts of the drive means 58 are representative and other suitable means could be used.

Figure 9:
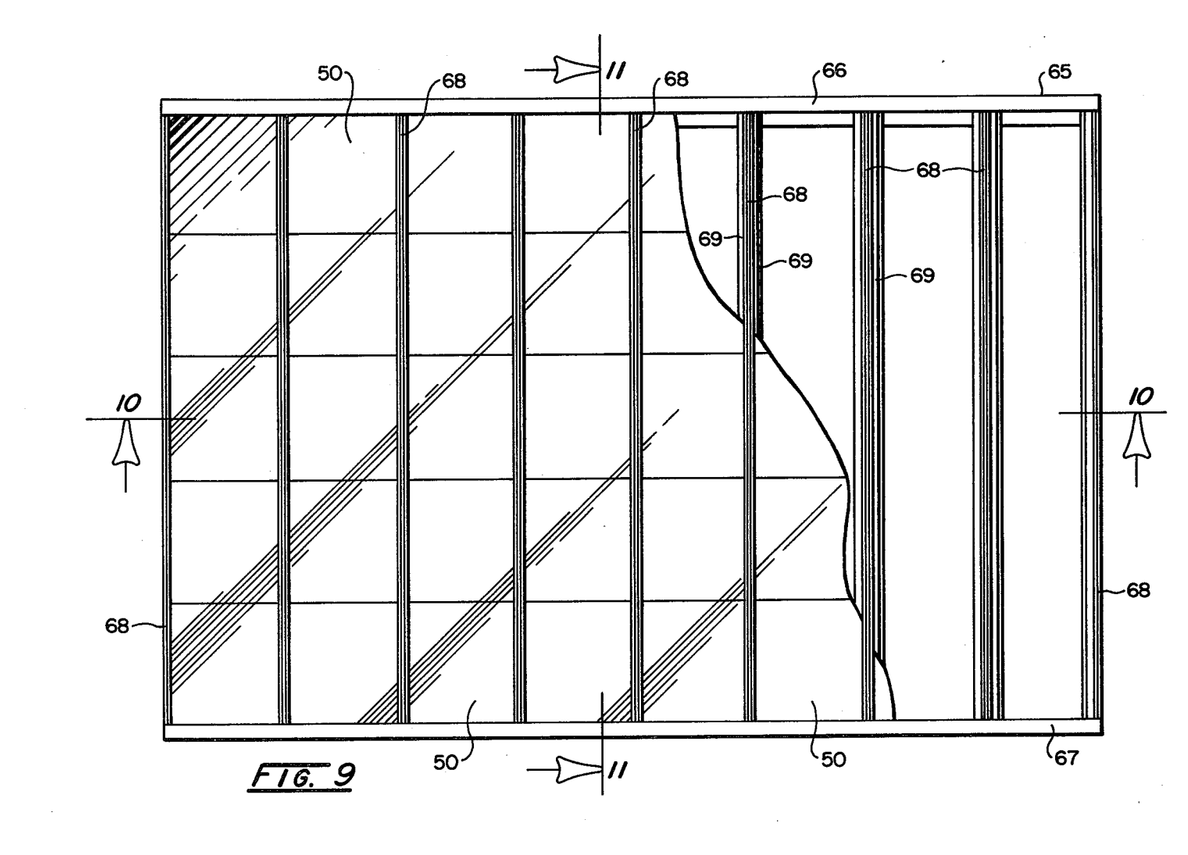
FIG. 9 is a partially sectional elevational view of the reflecting surface of the heliostat and frame of this invention, with a portion broken away to reveal the frame.
Figure 10:
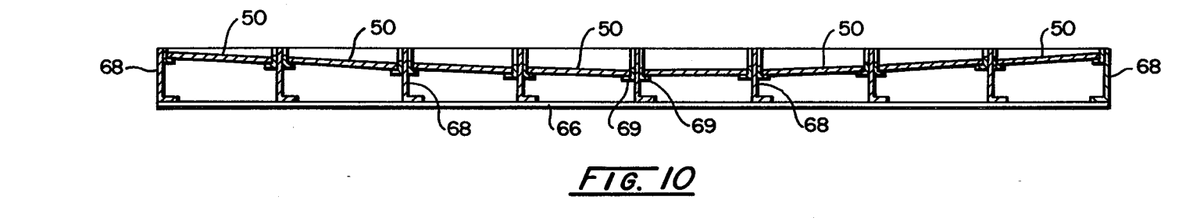
FIG. 10 is a cross-sectional elevation view taken along the line 10—10 of FIG. 9.
Figure 11:
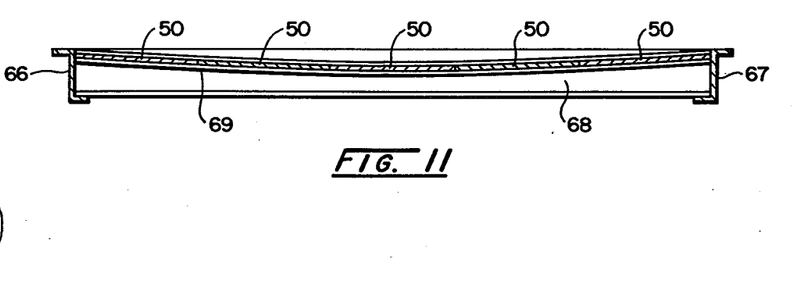
FIG. 11 is a cross-sectional elevation view taken along the line 11—11 of FIG. 9.

Referring also to FIGS. 9, 10 and 11, each heliostat comprises a frame 65 including an upper beam 66 and a lower beam 67 connected, such as by riveting or spot welding, to a plurality of vertical parallel stringers 68. Each stringer 68 is internally provided with a flange 69 fastened to one or both sides thereof, by means such as spot welding. As seen most clearly in FIG. 11, the flanges 69 are formed in a parabolic contour with greater depth of position on the web of stringer 68 at the central portion than at the edges adjacent to the beams 66.

Figure 12:
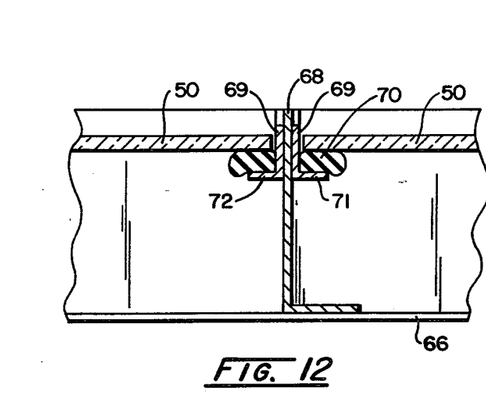
FIG. 12 is an enlarged cross-sectional view of a portion of a stringer in the frame of the heliostat of this invention.
Figure 13:
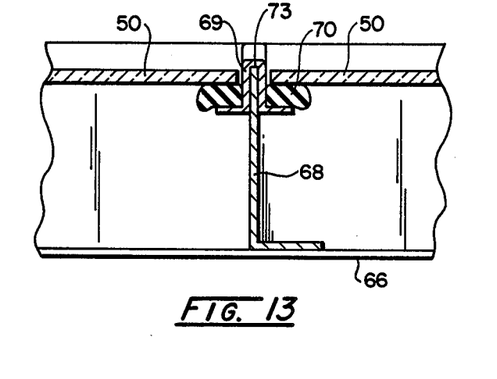
FIG. 13 is an enlarged cross-sectional view of a portion of another embodiment of a stringer in the frame of the heliostat of this invention.

As most clearly seen in FIGS. 12 and 13, the flanges 69 may be two separate pieces 71 and 72 which are spot welded on opposite sides of the web portion of the stringer 68, or there may be one formed piece which is shaped to fit over an edge 73 of the stringer 68. In the latter embodiment the flange 69 may be spot welded or press fitted or otherwise suitably fastened, such as with rivets.

Reflective facets 50 are positioned on the flanges 69 between the stringers 68. Each reflective facet 50 is fastened to the flange 69 by suitable means, which in the preferred embodiment of the invention is an adhesive 70. The adhesive may be of the conventional construction type such as the foam and paneling adhesive manufactured by PARR ® in Cleveland, Ohio.

The reflective facet 50 is preferably made from mirrored glass with the reflective side up and out facing the sun when the heliostate 37 is in its operative position. It has been found that single strength commercial grade ⅛ inch flat glass mirror panels, 1 foot square, give excellent results for the construction of a heliostat according to this invention. Under some circumstances, however, it may be that other reflective facets such as molded plastic materials, either flat or concave might be used. A typical heliostat constructed according to this invention has been built having five facets disposed between stringers in the vertical direction and eight in the horizontal direction.

As most clearly seen in FIGS. 10 and 11, the parabolic shape of the flanges 69 on the stringer 68 varies from one stringer to the next so that equally spaced points from the bottom beam 67 and the top beam 66 are points on a parabola in a plane perpendicular to the face of the heliostat 37. Each stringer thus has a shape which is an increment of a composite spherical parabola at a cross-section of the frame on a plane at the spaced apart position of the stringer. When the facets are in place on the flanges of the stringers, a multi-faceted composite parabolic heliostat surface is provided according to the construction of this invention.

Figure 14:
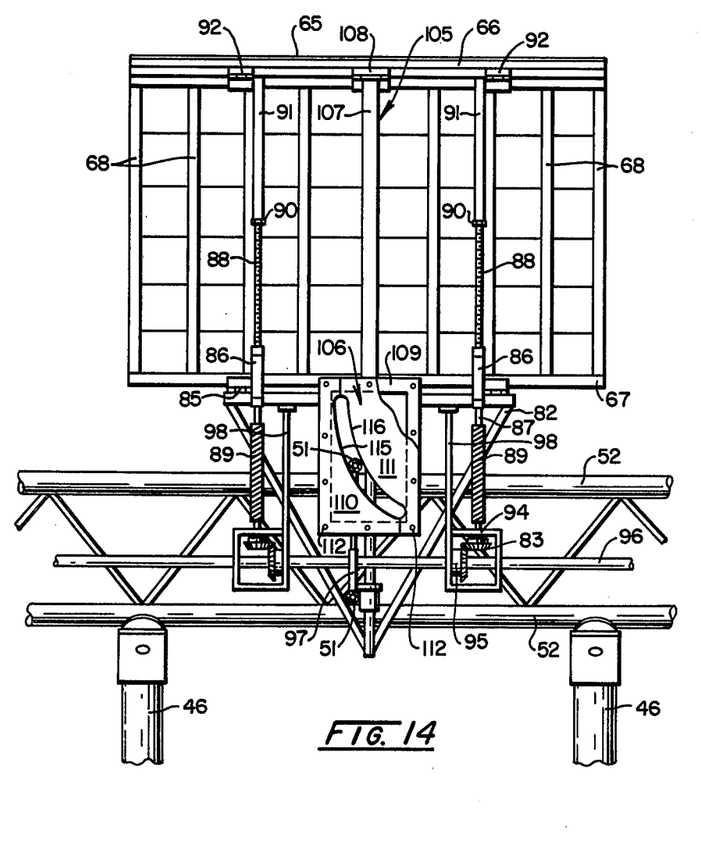
FIG. 14 is an elevational rear view of a portion of the platform and heliostat construction of this invention.

Referring to FIGS. 8 and 14, each heliostat 37 is pivotally supported on a lower edge 80 by a hinge means 81 which is fastened to the beam 67 on one side. The other side of the hinge means 81 is fastened to a support 82 at an appropriate outstanding position relative to the pedestal 83. The support 82 has a back member 85 generally parallel to the beams 66, 67 which carries at least one bearing housing 86 through which passes a shaft 87 having a threaded portion 88 on one end and a flexible portion 89 on the opposite end. Threaded portion 88 engages a nut 90 which is carried by a column 91 that is attached to the beam 66 by pivot means 92, such as a hinge.

At the opposite end of the flexible shaft 89 a bevel gear 93 is supported in a bearing and Journal box 94 to engage a second bevel gear 95 that is keyed to a shaft 96. Shaft 96 extends the arcuate length of the platform 31 and is supported on each lower truss member 51 by bearings 97.

Journal box 94 is suspended and supported from support member 85 by flexure member 98.

At a selected position along the length of the shaft 96, a drive means 100 such as a gear motor 101 is connected to a drive chain 102 and a sprocket 103 on the shaft 96.

It will be seen that the drive means 100 is operable to rotate the shaft 96 in either direction which in turn will rotate shaft 87 through the beveled gears 95 and 93. Rotation of the shaft 87 turns the threaded portion 88 in the nut 90 raising or lowering the beam 66 and pivoting the frame 65 of the heliostat 37 about the hinge means 81. Rotation of the heliostate 37 about the hinge means 81 changes the aiming point of the heliostat.

Means is provided (not shown) to operate the drive means 100 in response to the changing altitude of the sun either during the course of a single day or during the course of a year. Such control means may be activated by a computer memory in which is stored the historical data of the sun's position or it may be activated by sensing apparatus aimed toward the sun, either of which may be readily selected by those skilled in the art.

Referring to FIG. 6, in an embodiment of the invention in which the various heliostats are at different positions of elevation on a concave surface each lateral row will be motivated by a different shaft 96 and a different drive means 100.

Referring to FIG. 14, a centrally positioned vernier apparatus 105 is fastened to the top of the heliostat frame 65. Vernier apparatus 105 comprises a structure for supporting a cam means 106 which encompasses an upper truss beam 51 of the platform 31. The vernier apparatus 105 includes a strut member 107 depending from hinge means 108 on the upper beam 66. The strut member 107 supports a subframe 109 on which right and left hand cam members 110 and 111, respectively, are held by fastener means 112, such as bolts. The holes through which the bolts 112 pass in the cam members 110 and 111, respectively, are oversized so that the cam plates 110 and 111 may have their positions adjusted to slidingly engage without binding upon the beam 51.

It will be seen that as the frame 65 of the heliostat 37 is tilted up and down by the action of the altitude adjustment mechanism, either one side edge 115 or the other side edge 116 of the cam members 110, 111 will slide upon beam 52. This creates a lateral side force and vertically pivots the heliostate 37, together with the support 82, about the axis of the pedestal 83. As the heliostats 37 tracks the sun horizontally by movement with the platform 31 and vertically upon the hinge means 81, they are also influenced in a vernier adjustment individually according to their particular position in the array.

This vernier adjustment provides a further refinement of the adjustment of focus of each heliostat 37 upon the target in the receiver 40. By means of the adjustment available by loosening and tightening the bolts 112 each individual heliostat 37 may be precisely adjusted for the most optimum focus throughout its travel in both the azimuthal and altitudinal movements of tracking the sun.

In that embodiment of the invention shown in FIG. 6 where the platform 31 is mounted in a concave portion of the earth, all of the adjustments, measurements and maintenance required for the entire heliostatic field 30 can be readily made by workers who are standing on the ground. This ready access is a further advantage with reduces installation, maintenance and operating costs, as well as construction costs of the system of this invention.

EXAMPLE

To demonstrate the capabilities of the invention, several heliostats have been built. From the performance of these heliostats a solar energy conversion system has been conceived according to the following parameters and capabilities. Each heliostat comprises forty, one foot square flat single strength glass mirrors mounted in a frame having nine vertical stringers between which are mounted eight vertical rows of five mirrors each. The composite parabolic contour of each heliostat is constructed to focus the sun in a 1.4 m circle on a central receiver focal point which is mounted on a tower about 60 m high. The slant height from the focal point target area in the central receiver to the center of the farthest heliostat is about 120 m. It has been found that an average flux density of approximately 785 watts $cm^2$, is obtainable in a 1.4 m circle at the central receiver target.

Accordingly, a solar enegy conversion system is conceived comprising a total number of 2200 heliostats arranged in a 120° semi-circle about a central receiver which is on a tower 60 m high. The total heliostat area would be equal to 88,000 square feet (8,175.5 $m^2$). The 120° platform would rotate 180° and the total field would require 300° of platform supports. The power intercepted by the heliostats (assuming a solar insolation of 800 watts per square m and a mirror reflectivity of 0.9) would be equal to 5.88 MW. It is known that the total concentrator area projected normal to the central ray from the sun is about 0.95 times the total concentrator area. Thus the power intercepted by the heliostat field would be 5.6 MW.

In view of the high density of usage of the heliostatic area, the blocking and shading having been reduced to a minimum, it is projected that the absorbed power at the receiver would uniformly average 5.1 MW.

Because of the simplicity of construction of the heliostats and the efficiency of the arrangements of heliostats in the invention, the estimated cost of reflective area is less than $55.00 per $m^2$ for the heliostat field. This is to be compared with the as yet unattained goal set by the Department of Energy of $100.00 per $m^2$ (1978 dollars) or reflective area by the year 1990.

It is herein understood that although the present invention has been specifically disclosed with the preferred embodiments and examples, modification and variations of the concept herein disclosed may be resorted to by those skilled in the arts. Such modifications and variations are considered to be within the scope of the invention and the appended claims.

What is claimed is:

1. A solar energy conversion system including a field of a plurality of heliostats, a plurality of light reflecting facets on each heliostat, a central receiver a selected distance apart from said heliostats, and positioning means to position each heliostat to focus the rays of the sun on the central receiver, comprising:
   (a) at least one platform supporting a plurality of heliostats with each heliostat constituting a frame having edges and supporting a plurality of reflecting facets fixidly positioned on the frame, which in combination comprise a multi-faceted composite parabolic heliostat surface, with each heliostat focused on the central receiver;
   (b) each platform being constructed of at least one truss member curved to substantially match a circumferential curve with respect to the central receiver, each platform being moveable in a substantially circular path in a horizontal plane about the central receiver as a center, at least one of the curved truss members being supported by a plurality of rollers mounted on supporting means in the ground; and
   (c) each frame pivotally mounted on a platform for movement about two axes, one axis generally tangential to the circumferential curve, and the other axis generally perpendicular to the horizontal plane.

2. A solar energy conversion system according to claim 1 wherein the supporting roller means are arranged in a concave depression in the ground which is substantially and generally semi-spherically shaped with the central receiver as a center in the horizontal plane.

3. A solar energy conversion system according to claim 1 wherein a portion of the frames are arranged on the platform at successively higher elevations and successively larger angles relative to the horizontal plane.

4. A solar energy conversion system according to claim 3 wherein means is provided to move each platform along the circular path about the central receiver center responsive to the azimuth position of the sun at various times of a day.

5. A solar energy conversion system according to claim 4 wherein means is provided to move each platform along the circular path about the central receiver center responsively to the aximuth position of the sun at various times of a year.

6. A solar energy conversion system according to claim 5 wherein means is provided to rotate each frame about said other perpendicular axis responsive to the position of the platform in its circular path about the central receiver center.

7. A solar conversion energy system according to claim 1 wherein the facets are glass mirrors.

8. A solar energy conversion system according to claim 7 wherein the mirrors are flat.

9. A solar energy conversion system according to claim 1 in which each curved truss member is constructed as a segment of a circle.

* * * * *